United States Patent
Tobise et al.

(10) Patent No.: US 6,233,404 B1
(45) Date of Patent: May 15, 2001

(54) ELECTRONIC FLASH DEVICE FOR CAMERA

(75) Inventors: Manabu Tobise; Takashi Tobioka, both of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/414,160

(22) Filed: Oct. 8, 1999

(30) Foreign Application Priority Data

Oct. 9, 1998 (JP) .................................................. 10-288419

(51) Int. Cl.[7] ...................................................... G03B 15/03
(52) U.S. Cl. .............................. 396/61; 396/164; 396/176
(58) Field of Search ................................... 396/176, 164, 396/155, 61, 62, 198; 362/16, 17, 18

(56) References Cited

U.S. PATENT DOCUMENTS 4,066,884 * 1/1978 Taylor ................................. 362/16 X
4,695,130 * 9/1987 Medina et al. ...................... 362/16 X
5,614,970 * 3/1997 Takagi et al. ......................... 396/164

FOREIGN PATENT DOCUMENTS 9-138456   5/1997  (JP) .

* cited by examiner

Primary Examiner—W. B. Perkey
(74) Attorney, Agent, or Firm—Young & Thompson

(57) ABSTRACT

An electronic flash device for a camera includes a flash emitting component, substantially quadrilateral, having vertical and horizontal side lines, for emitting flash light. A light reducing plate is disposed in front of the flash emitting component, extended in a vertical direction, and has a predetermined width in a horizontal direction. The predetermined width is shorter than the horizontal side lines. The light reducing plate intercepts a central portion of the flash emitting component. First and second lateral portions of the flash emitting component remain uncovered for illumination with a restricted amount of the flash light.

17 Claims, 4 Drawing Sheets

ELECTRONIC FLASH DEVICE FOR CAMERA

BACKGROUND OF THE INVENTION

1. Field of the Invention

The present invention relates to an electronic flash device for a camera. More particularly, the present invention relates to an electronic flash device for a camera in which flash light can be effectively applied to a photographic subject located at a very near distance in closeup photography.

2. Description Related to the Prior Art

There are various types of commercially available cameras. Many types of cameras incorporate an automatic focus changing mechanism and an automatic exposure adjusting mechanism for automated focusing and adjustment of exposure. Some flash-built-in type of camera is provided with an automatic light adjustor, which adjusts an emitted amount of flash light automatically according to a photographic subject distance and photographic subject brightness For flash photography of a photographic subject at a very near distance with such a camera, an aperture stop is stopped down, or an emitted amount of the flash light is reduced, to optimize exposure of the photographic subject.

If the camera is a low-cost type without the automatic exposure adjusting mechanism or the automatic light adjustor, the subject brightness is excessive if flash light is emitted at the very near distance, to result in an over-exposure photograph. Distribution of the flash light is predetermined for illumination to a photographic field at a normally used range of a subject distance in flash photography. If the photographic subject is located at a nearer distance than this normally used range, a central portion of one frame is illuminated considerably by the flash light, to create a great difference in the emitted light amount from peripheral portion of the frame. As a result, a photographic print is likely to have the excessively white central portion.

JP-A 9-138456 discloses an adapter attachable to the camera for a good condition of closeup photography even if the camera does not have the automatic exposure adjusting mechanism or the automatic light adjustor. In the document, an auxiliary lens is disposed in the adapter for changing a focal point to a position offset in the direction of the near distance from an initial focal point. The auxiliary lens is fixedly disposed in front of a taking lens of the camera, to enable the closeup photography of the photographic subject at the very near distance. Also the adapter is provided with a light reducing plate, which includes a light-shielding flat plate and a number of holes formed therein for passing of the flash light. For the closeup photography, a flash emitting component of the flash device is associated with the light reducing plate set in front thereof for restrict the amount of the flash light to be applied to the photographic subject. Note that the holes for passing of the flash light have a size and arrangement each determined in consideration of the emitted amount and distribution of the flash light emitted from the flash emitting component.

In the light reducing plate, there are formed a great number of holes for passing of the flash light. If a great amount of the flash light is emitted from the flash emitting component, the holes do not effectively operate for light reduction. The holes are very close to one another, so that fluxes of the flash light through the holes are overlapped on one another at the photographic subject at the very near distance. There occur bright and dark portions of photographic subject distinct apparently from one another. Differences between the bright and dark portions are so conspicuous according to greatness of the amount of the flash light, to lower evenness in the illumination.

Furthermore the light reducing plate of the prior art has a size totally covering the flash emitting component. If the light reducing plate is incorporated in the camera, a large space in the camera is required for retreat of the light reducing plate from the flash emitting component. There occurs unwanted enlargement of the camera.

SUMMARY OF THE INVENTION

In view of the foregoing problems, an object of the present invention is to provide an electronic flash device for a camera in which distribution of flash light can be optimally obtained in a subject distance region of the very near distance and also with a simple structure.

In order to achieve the above and other objects and advantages of this invention, an electronic flash device for a camera includes a flash emitting component, substantially quadrilateral, having vertical and horizontal side lines, for emitting flash light. A light reducing plate is disposed in front of the flash emitting component, extended in a vertical direction, and has a predetermined width in a horizontal direction. The predetermined width is shorter than the horizontal side lines. The light reducing plate intercepts a central portion of the flash emitting component. First and second lateral portions of the flash emitting component remain uncovered for illumination with a restricted amount of the flash light.

In a preferred embodiment, the light reducing plate substantially has a vertically symmetrical shape with reference to the central portion, and substantially has a horizontally symmetrical shape with reference to the central portion.

The flash emitting component includes a flash discharge tube disposed to extend horizontally. A reflector is disposed with a curve behind the flash discharge tube, for reflecting part of the flash light forwards after being emitted rearwards by the flash discharge tube. A transparent diffusing plate is disposed in front of the flash discharge tube, longer horizontally than vertically, for diffusion and forward emission of the flash light from the flash discharge tube and the reflector.

The flash emitting component has a size and a shape adapted to illumination of a photographic field at a first subject distance. The light reducing plate adapts the flash light to illumination of a photographic field at a second subject distance shorter than the first subject distance.

Furthermore, a retention mechanism retains the light reducing plate on the flash emitting component in a disengageable manner.

In another preferred embodiment, the light reducing plate, when in an effective position, intercepts the central portion. Furthermore, a changeover mechanism is operable externally, for moving the light reducing plate between the effective position and an ineffective position. The light reducing plate, when in the ineffective position, is located offset from the flash emitting component, for allowing the flash emitting component fully to emit the flash light.

The changeover mechanism, when a subject distance is within a first distance range, is set in the ineffective position, and when a subject distance is within a second distance range being a nearer distance than the first distance range, is set in the effective position.

Furthermore, the camera includes a front wall disposed in front of the flash emitting component. A flash emitting window is formed in the front wall, for illumination of the flash light from the flash emitting component. The changeover mechanism includes a sliding space, defined behind the front wall and in front of the flash emitting component, for receiving insertion of the light reducing plate, to keep the light reducing plate slidable. The light reducing plate, when in the ineffective position, is covered by the front wall, and when in the effective position, is positioned in the flash emitting window.

The changeover mechanism further includes a changeover button portion disposed with the light reducing plate, operated externally, for sliding the light reducing plate along the sliding space.

In still another preferred embodiment, the changeover mechanism includes a hinge portion, disposed to extend along one of the horizontal side lines of the flash emitting component, secured to a horizontal edge of the light reducing plate, for supporting the light reducing plate in a rotatable manner.

In another preferred embodiment, the light reducing plate is substantially quadrilateral, and has first and second vertical edges curved concavely.

In a further preferred embodiment, the light reducing plate is substantially quadrilateral, and has first and second vertical edges curved with a corrugation.

In another preferred embodiment, the camera is a lens-fitted photo film unit.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
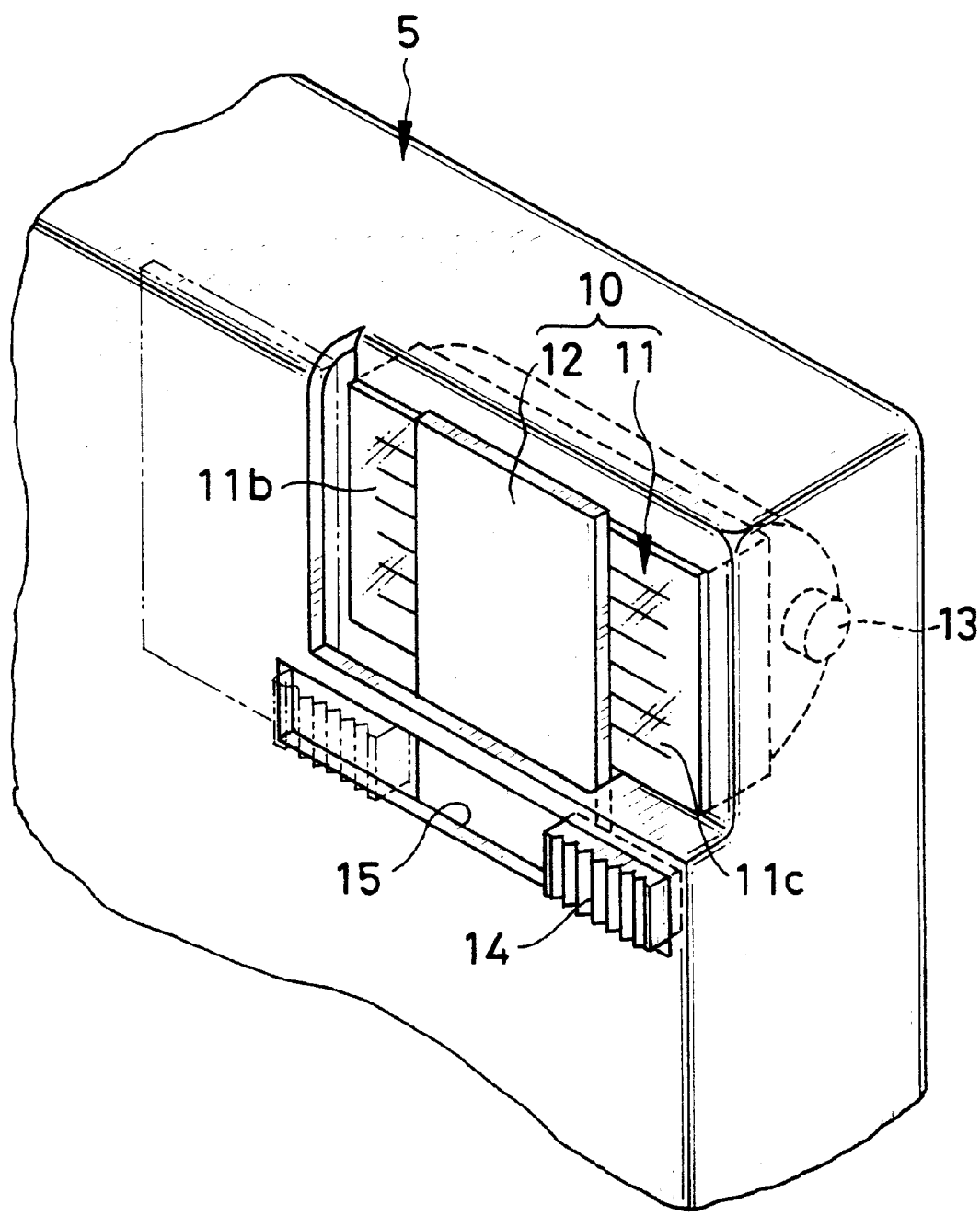
FIG. 1 is a perspective, partially broken, illustrating an electronic flash device in a camera according to the present invention.

In FIG. 1, a camera 5 or a lens-fitted photo film unit incorporating an electronic flash device 10 is illustrated in accordance with the present invention. The flash device 10 includes a flash emitting component 11 and a light reducing plate 12. The flash emitting component 11 contains a flash discharge tube 13 or xenon tube, which is driven to flash. The flash emitting component 11 is disposed in a front face of the camera 5, and illuminates with flash light from the flash discharge tube 13 and a reflector behind the flash discharge tube 13. The flash light from the flash emitting component 11 is at a predetermined light amount adapted to a normally used range of a subject distance in flash photography.

The light reducing plate 12 is a flat plate having a light-shielding property. The light reducing plate 12 is dark and opaque. The light reducing plate 12 is slidable between a light reducing position or effective position as indicated by the solid line in FIG. 1 where the light reducing plate 12 is positioned on a front face of the flash emitting component 11, and an initial position or ineffective position as indicated by the phantom line in FIG. 1 where the light reducing plate 12 is positioned out of the light path or a region in front of the flash emitting component 11. A changeover button portion 14 or a changeover mechanism is associated with the light reducing plate 12. A slot 15 is formed in the camera 5, and receives the changeover button portion 14 which is slidable and externally operable in the slot 15. When the changeover button portion 14 is operated to move horizontally, the light reducing plate 12 is moved between the effective and ineffective positions.

Figure 2:
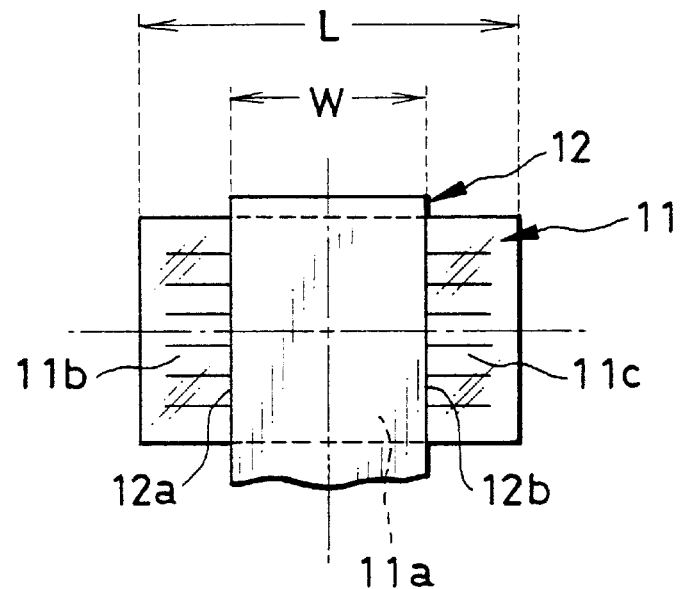
FIG. 2 is an explanatory view in front elevation, illustrating a flash emitting component and a light reducing plate.

In FIG. 2, the light reducing plate 12 has a predetermined width W, which is smaller than a horizontal range L of the flash emitting component 11. When the light reducing plate 12 is set in the effective position, a central portion 11a of a diffusing plate of the flash emitting component 11 is covered by the light reducing plate 12 extending vertically. Lateral portions 11b and 11c of the diffusing plate of the flash emitting component 11 remain uncovered. Vertical edges 12a and 12b of the light reducing plate 12 are straight. The light reducing plate 12 has a shape vertically symmetrical with reference to the central portion 11a, and also horizontally symmetrical with reference to the central portion 11a. The light reducing plate 12 is a piece molded from plastic material, or may be a metal piece obtained by pressing.

As the light reducing plate 12 has a simple shape of a flat plate, the light reducing plate 12 can be produced easily and with high precision in comparison with a light reducing plate including plural holes formed in consideration of light distribution.

Figure 3:
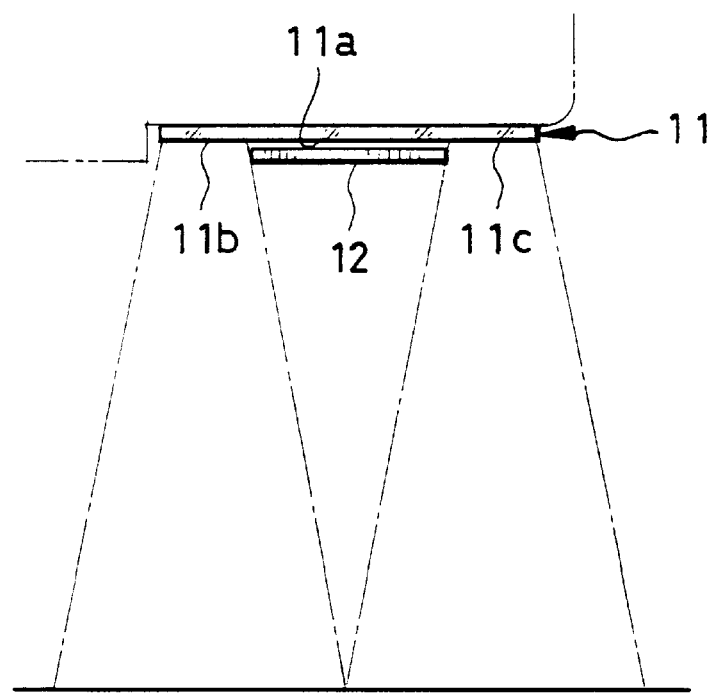
FIG. 3 is an explanatory view in plan, illustrating illumination from the flash emitting component with the light reducing plate.

For flash photography of a photographic subject located at a very near distance, the changeover button portion 14 is operated to set the light reducing plate 12 in the effective position. In FIG. 3, the light path of the flash emitting component 11 is intercepted at the central portion 11a by the light reducing plate 12. Flash light is emanated only through the lateral portions 11b and 11c to illuminate the photographic subject. Accordingly a total amount of the flash light applied to a photographic field is reduced considerably as compared with a setting in which the light reducing plate 12 is in the ineffective position away from the front of the flash emitting component 11.

The lateral portions 11b and 11c of the flash emitting component 11, through which flash light is passed, is located W distant from each other. There is slight possibility of overlapping two fluxes of flash light being emitted in the photographic field at the closeup distance. If a light reducing plate has a great number of holes, there occur bright and dark portions distinct between them. But in the present invention, irradiance of the flash light can be regularized in the whole of a region to be photographed.

For flash photography of a photographic subject located at a distance in the normally used range of a subject distance in the flash photography, the changeover button portion 14 is operated to set the light reducing plate 12 in the ineffective position. As the predetermined width W of the light reducing plate 12 is smaller than the range L of the flash emitting component 11, a space as long as the predetermined width W beside the flash emitting component 11 should be maintained for moving away the light reducing plate 12 from the front face of the flash emitting component 11 by horizontal movement. If the predetermined width W of the light reducing plate 12 is equal to the range L, space for receiving the light reducing plate 12 away from the flash emitting component 11 must be considerably large, to cause unwanted enlargement of the size of the camera. However the predetermined width W of the light reducing plate 12 is advantageously smaller than the range L in the present embodiment, because the space for receiving the light reducing plate 12 away from the flash emitting component 11 can be smaller, and can prevent unwanted enlargement of the size of the camera.

Figure 4:
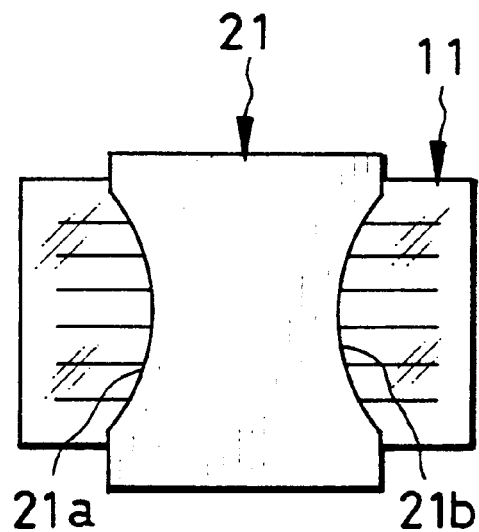
FIG. 4 is an explanatory view in front elevation, illustrating the flash emitting component and another preferred light reducing plate with curved edges.
Figure 5:
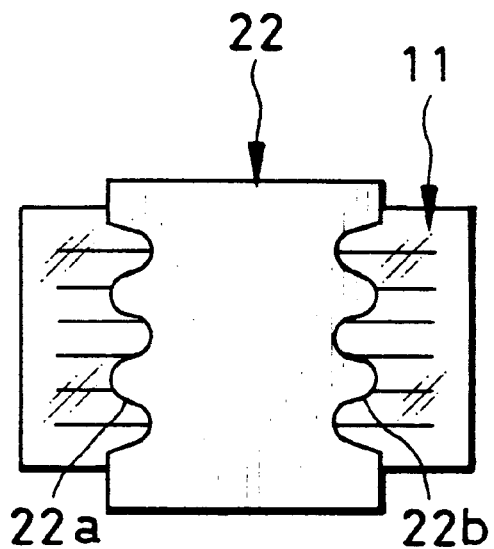
FIG. 5 is an explanatory view in front elevation, illustrating the flash emitting component and another preferred light reducing plate with corrugated edges.

In the above embodiment, the vertical edges of the light reducing plate 12 are straight. However a light reducing plate 21 as illustrated in FIG. 4 is provided with concavely curved vertical edges 21a and 21b. Also a light reducing plate 22 in FIG. 5 may be used. The light reducing plate 22 is provided with corrugated vertical edges 22a and 22b. The light reducing plates 21 and 22 adjust flash light from the lateral portions 11b and 11c in a more effective manner, reliably to regularize irradiance of the flash light in the whole of a frame region to be photographed. It is to be noted that the plate shape of both of the light reducing plates 21 and 22 should be vertically symmetrical with reference to the central portion 11a, and also horizontally symmetrical with reference to the central portion 11a.

In the embodiments of FIGS. 1–5, the light reducing plate 12 is horizontally slid. However the light reducing plate 12 may be slidable in a vertically direction to move into and out of the light path.

Also note that the changeover button portion 14 may be eliminated from the flash device. The light reducing plate 12 may be moved directly by manual operation.

Figure 6:
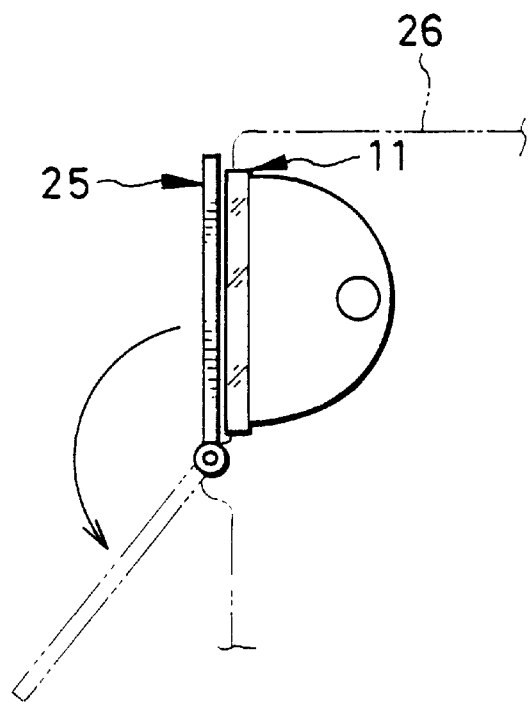
FIG. 6 is an explanatory view in side elevation, illustrating a pivotally movable light reducing plate according still another preferred embodiment.

In the above embodiment, the light reducing plate is slidable. In FIG. 6, a pivotal light reducing plate 25 is disposed in a rotatable manner on a camera 26 or a lens-fitted photo film unit. The light reducing plate 25 is rotationally moved between a light reducing position or effective position where fitted on the front of the flash emitting component 11 and an initial position or ineffective position where uncovered from the flash emitting component 11.

Also, a light reducing plate may be disposed in a manner rotatable about a pivot located under the light emitting component and oriented erectly from the front face of the flash emitting component, and may be swung between the effective position and an ineffective position where the light reducing plate is inclined toward the center of the camera away from the flash emitting component.

Figure 7:
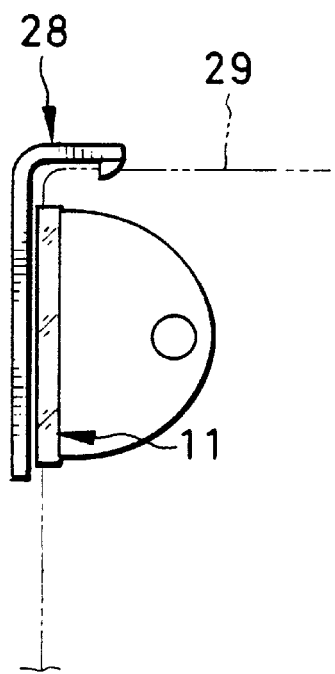
FIG. 7 is an explanatory view in side elevation, illustrating another preferred light reducing plate engageable with a camera body.

In any of the above embodiments, the light reducing plate is incorporated and movable therein. However a removable light reducing plate 28 of FIG. 7 may be secured to the front face of the flash emitting component 11 in a disengageable manner. A camera 29 or a lens-fitted photo film unit can support the light reducing plate 28 if the light reducing plate 28 has claws or hooks engaged with camera.

It is to be noted that the flash emitting component 11 may have claw receiving portions which can be engaged with claws or hooks of a removable light reducing plate without engagement with the body of the camera 29. Also, the camera 29 or the flash emitting component 11 may be provided with channel-shaped plate-receiving gaps, which can be directly engaged with edge portions of a removable light reducing plate for its retention. Such a removable light reducing plate does not require claws or hooks.

It is also possible to use the light reducing plate in an adapter disclosed in JP-A 9-138456. The adapter includes a front plate, which is pivotally movable between a closeup position and an initial position. The front plate, when in the closeup position, is positioned on a front face of the camera, and when in the initial position, is unfolded upwards from the camera. The front plate includes a first opening corresponding to the taking lens, a second opening corresponding to the viewfinder, and a third opening corresponding to the flash emitting component. The first, second and third openings have respectively an auxiliary lens, a half mirror and the light reducing plate of the present invention.

It is also possible to incorporate the light reducing plate in a camera provided with a focus adjusting mechanism or a zooming mechanism. The light reducing plate can be moved by a linking mechanism, which drives the changeover mechanism when the focus adjusting mechanism moves the taking lens.

In the above embodiments, the light reducing plate is completely opaque. It is alternatively possible to use a translucent light reducing plate. Such a translucent light reducing plate should have a dark color, and so high density as to intercept considerable part of flash light.

In the above embodiments, the light reducing plate has the predetermined small width W. However an alternative plate as large as the flash emitting component may be used, may have first and second lateral portions and a central portion disposed between them. The first and second lateral portions can be transparent and located at the lateral portions 11b and 11c of the diffusing plate of the flash emitting component 11. The central portion may be opaque and have the predetermined small width W.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An electronic flash device for a camera, comprising:
   a flash emitting component adapted to emit flash light; and
   a light reducing plate adapted to be selectively positionable to block a portion of said flash light emitted by a central portion of said flash emitting component, said light reducing plate being free of an aperture through which the light transmitted through the flash emitting component may pass,
   wherein the electronic flash device is constructed so as not to filter the light which passes by the light reducing plate on a first side differently from the light which passes by the light reducing plate on a second side.

2. An electronic flash device as defined in claim 1, wherein said light reducing plate splits said flash emitting component into said central portion and two lateral portions.

3. An electronic flash device as defined in claim 2, wherein said light reducing plate substantially has a vertically symmetrical shape with reference to said central portion, and substantially has a horizontally symmetrical shape with reference to said central portion.

4. An electronic flash device as defined in claim 3, wherein said light reducing plate is movable between a state set in front of said flash emitting component and a state set away from said flash emitting component.

5. An electronic flash device as defined in claim 4, wherein said flash emitting component includes:
   a flash discharge tube disposed to extend horizontally;
   a reflector, disposed with a curve behind said flash discharge tube, for reflecting part of said flash light forwards after being emitted rearwards by said flash discharge tube; and
   a transparent diffusing plate, disposed in front of said flash discharge tube, for diffusion and forward emission of said flash light from said flash discharge tube and said reflector.

6. An electronic flash device as defined in claim 5, wherein said flash emitting component has a size and a shape adapted to illumination of a photographic field at a first subject distance; and
   said light reducing plate changes a size of said flash emitting component for illumination of a photographic field at a second subject distance shorter than said first subject distance.

7. An electronic flash device as defined in claim 6, further comprising a retention mechanism for retaining said light reducing plate on said flash emitting component in a disengageable manner.

8. An electronic flash device as defined in claim 3, further comprising a changeover mechanism for moving said light reducing plate between an effective position and an ineffective position, wherein said light reducing plate, when in said ineffective position, is located offset from said flash emitting component, for allowing said flash emitting component fully to emit said flash light, and when in said effective position, is set at said central portion.

9. An electronic flash device as defined in claim 8, wherein said light reducing plate, when in said ineffective position, is positioned inside said camera.

10. An electronic flash device as defined in claim 8, wherein said changeover mechanism, when a subject distance is within a first distance range, is set in said ineffective position, and when a subject distance is within a second distance range being a nearer distance than said first distance range, is set in said effective position.

11. An electronic flash device as defined in claim 8, wherein said camera includes:
   a front wall disposed in front of said flash emitting component, wherein said light reducing plate, when in said ineffective position, is located behind said front wall; and
   a flash emitting window, formed in said front wall, for illumination of said flash light from said flash emitting component.

12. An electronic flash device as defined in claim 11, wherein said changeover mechanism further includes a changeover button portion disposed with said light reducing plate, operated externally, for sliding said light reducing plate.

13. An electronic flash device as defined in claim 8, wherein said changeover mechanism includes a hinge portion for supporting said light reducing plate in a rotatable manner.

14. An electronic flash device as defined in claim 8, wherein said light reducing plate is substantially quadrilateral, and has first and second vertical edges curved concavely.

15. An electronic flash device as defined in claim 8, wherein said light reducing plate is substantially quadrilateral, and has first and second vertical edges with a corrugation.

16. An electronic flash device as defined in claim 3, wherein said camera is a lens-fitted photo film unit.

17. A camera comprising:
   a flash emitting component, substantially quadrilateral, for emitting flash light; and
   a light reducing plate, adapted to be selectively positioned in front of said flash emitting component to intercept the flash light emitting from a central portion of said flash emitting component and being free of an aperture through which the flash light may pass,
   wherein the flash light emitted by first and second lateral portions on opposite sides of the central portion of said flash emitting component illuminate with said flash light, and the first and second lateral portions do not filter the flash light differently from one another.

* * * * *